United States Patent
Lawson (10) Patent No.: US 7,250,797 B1
(45) Date of Patent: Jul. 31, 2007

(54) EVENT EDGE SYNCHRONIZATION SYSTEM AND METHOD OF OPERATION THEREOF

(75) Inventor: Shannon E. Lawson, Pflugerville, TX (US)

(73) Assignee: Agere Systems Inc., Allentown, PA (US)

( * ) Notice: Subject to any disclaimer, the term of this patent is extended or adjusted under 35 U.S.C. 154(b) by 1212 days.

(21) Appl. No.: 09/821,898

(22) Filed: Mar. 30, 2001

(51) Int. Cl.
*H03L 7/00* (2006.01)
*H04L 7/00* (2006.01)

(52) U.S. Cl. .................. 327/144; 375/354; 375/368

(58) Field of Classification Search ............ 375/357, 375/368, 354; 370/311; 327/144
See application file for complete search history.

(56) References Cited

U.S. PATENT DOCUMENTS

| | | | | |
|---|---|---|---|---|
| 3,873,773 A * | 3/1975 | Guy, Jr. | ............... | 370/505 |
| 5,003,558 A * | 3/1991 | Gregg | ............... | 375/357 |
| 5,638,410 A * | 6/1997 | Kuddes | ............... | 375/357 |
| 5,663,942 A * | 9/1997 | Ishibashi et al. | ......... | 369/53.34 |
| 5,857,005 A * | 1/1999 | Buckenmaier | ............. | 375/357 |
| 5,905,766 A * | 5/1999 | Nguyen | ............... | 375/354 |
| 6,016,312 A * | 1/2000 | Storm et al. | ............. | 370/311 |
| 6,075,833 A * | 6/2000 | Leshay et al. | ............. | 377/16 |
| 6,260,152 B1 * | 7/2001 | Cole et al. | ............. | 713/400 |
| 6,359,946 B1 * | 3/2002 | Ryan | ............... | 375/371 |
| 6,594,327 B1 * | 7/2003 | Radi | ............... | 375/356 |

* cited by examiner

*Primary Examiner*—David C. Payne
*Assistant Examiner*—Aslan Ettehadieh (57) ABSTRACT

The present invention provides an event edge synchronization system and a method of operating the same. In one embodiment, the event edge synchronization system includes: (1) a first clock zone device configured to generate an event signal based upon a first clock rate, (2) a second clock zone device configured to operate at a second clock rate, which is asynchronous with the first clock rate and (3) a synchronous notification subsystem configured to receive the event signal, synchronize the event signal to the second clock rate based upon an edge transition of the event signal and the second clock rate, and generate a synchronous notification signal therefrom.

5 Claims, 7 Drawing Sheets

EVENT EDGE SYNCHRONIZATION SYSTEM AND METHOD OF OPERATION THEREOF

TECHNICAL FIELD OF THE INVENTION

The present invention is directed, in general, to a communications system and, more specifically, to an event edge synchronization system and method of operating the same.

BACKGROUND OF THE INVENTION

Communications networks are currently undergoing a revolution brought about by the increasing demand for real-time information being delivered to a diversity of locations. Many situations require the ability to transfer large amounts of data across geographical boundaries with increasing speed and accuracy. However, with the increasing size and complexity of the data that is currently being transferred, maintaining the speed and accuracy is becoming increasingly difficult.

Early communications networks resembled a hierarchical star topology. All access from remote sites was channeled back to a central location where a mainframe computer resided. Thus, each transfer of data from one remote site to another, or from one remote site to the central location, had to be processed by the central location. This architecture is very processor-intensive and incurs higher bandwidth utilization for each transfer. This was not a major problem in the mid to late 1980s where fewer remote sites were coupled to the central location. Additionally, many of the remote sites were located in close proximity to the central location. Currently, hundreds of thousands of remote sites are positioned in various locations across assorted continents. Legacy networks of the past are currently unable to provide the data transfer speed and accuracy demanded in the marketplace of today.

In response to this exploding demand, data transfer through networks employing distributed processing has allowed larger packets of information to be accurately and quickly distributed across multiple geographic boundaries. Today, many communication sites have the intelligence and capability to communicate with many other sites, regardless of their location. This is typically accomplished on a peer level, rather than through a centralized topology, although a host computer at the central site can be appraised of what transactions take place and can maintain a database from which management reports are generated and operation issues addressed.

Distributed processing currently allows the centralized site to be relieved of many of the processor-intensive data transfer requirements of the past. This is typically accomplished using a data network, which includes a collection of routers. The routers allow intelligent passing of information and data files between remote sites. However, increased demand and the sophistication required to route current information and data files quickly challenged the capabilities of existing routers. Also, the size of the data being transmitted is dramatically increasing. Some efficiencies are obtained by splitting longer data files into a collection of smaller, somewhat standardized cells for transmission or routing. However, these efficiencies are somewhat offset by the processing required to process the cells at nodes within the network.

More specifically, within the system there are limitations associated with passing event signals between two different subsystems or within a subsystem that employs two clock zones having asynchronous clock rates. Currently, this typically requires a "four-edge" synchronization process between the two asynchronous clock zones. This four-edge synchronization process requires the generation of a first event signal in a first clock zone that is then recognized and acknowledged by a first event signal in the second clock zone. A second event signal is then generated in the first clock zone to acknowledge that the second clock zone has acknowledged the first event signal in the first clock zone. Then, a second event signal is generated in the second clock zone that acknowledges the second event signal acknowledgment in the first clock zone. This process is time consuming and slows the interchange of information or data within a system or subsystem.

Accordingly, what is needed in the art is an enhanced way to pass event signals between two asynchronous clock zones.

SUMMARY OF THE INVENTION

To address the above-discussed deficiencies of the prior art, the present invention provides an event edge synchronization system and a method of operating the same. In one embodiment, the event edge synchronization system includes: (1) a first clock zone device configured to generate an event signal based upon a first clock rate, (2) a second clock zone device configured to operate at a second clock rate, which is asynchronous with the first clock rate and (3) a synchronous notification subsystem configured to receive the event signal, synchronize the event signal to the second clock rate based upon an edge transition of the event signal and the second clock rate, and generate a synchronous notification signal therefrom.

In another embodiment, the present invention provides a method of operating an event edge synchronization system that includes: (1) generating an event signal based upon a first clock rate associated with a first clock zone device, (2) operating a second clock zone device at a second clock rate, which is asynchronous with the first clock rate, (3) receiving the event signal, (4) synchronizing the event signal to the second clock rate based upon an edge transition of the event signal and the second clock rate, and (5) generating a synchronous notification signal therefrom.

In another embodiment, the present invention also provides an event edge synchronization system that includes: (1) a first clock zone device means that generates an event signal based upon a first clock rate, (2) a second clock zone device means that operates at a second clock rate, which is asynchronous with the first clock rate and (3) a synchronous notification subsystem means that receives the event signal, synchronizes the event signal to the second clock rate based upon an edge transition of the event signal and the second clock rate, and generates a synchronous notification signal.

The present invention also provides, in another embodiment, a fast pattern processor that includes: (1) a data buffer that stores processing blocks associated with a protocol data unit (PDU), (2) a context memory subsystem associated with the data buffer that receives the processing blocks, (3) a pattern processing engine, associated with the context memory, that performs pattern matching upon the processing blocks and (4) an output interface subsystem that receives the processing blocks from the data buffer or the context memory subsystem and re-transmits packets or payloads embodied within the processing blocks.

The output interface subsystem further including a first-in-first-out (FIFO) buffer and an event edge synchronization system that provides a synchronous notification signal indicating that a block of data of the FIFO buffer has been retrieved and re-transmitted. The event edge synchronization system includes: (1) a first clock zone device that generates an event signal based upon a first clock rate, the first clock zone device is associated with an output portion of the FIFO buffer, (2) a second clock zone device that receives the synchronous notification signal based upon a second clock rate and performs processing based upon the synchronous notification signal, the second clock rate asynchronous with the first clock rate and (3) a synchronous notification subsystem that receives the event signal, synchronizes the event signal to the second clock rate based upon an edge transition of the event signal and the second clock rate, and generates the synchronous notification signal.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
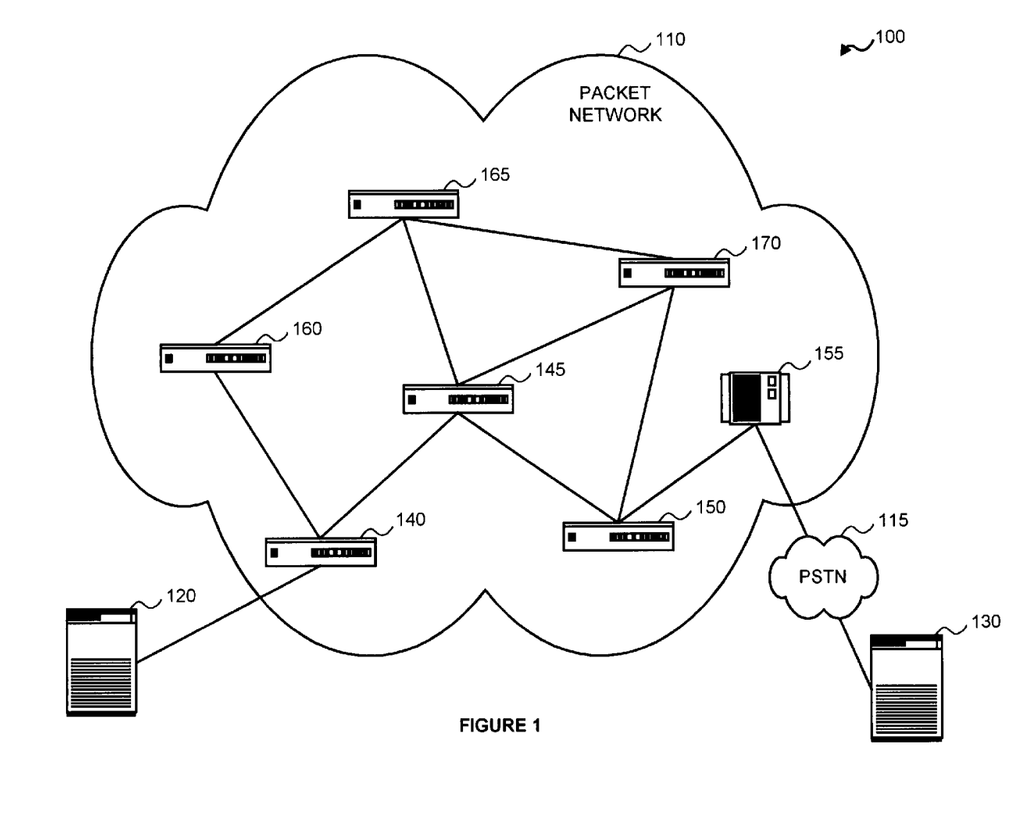
FIG. 1 illustrates a block diagram of an embodiment of a communications network, constructed in accordance with the principles of the present invention.

Referring initially to FIG. 1, illustrated is a block diagram of an embodiment of a communications network, generally designated 100, constructed in accordance with the principles of the present invention. The communications network 100 is generally designed to transmit information in the form of a data packet from one point in the network to another point in the network.

As illustrated, the communications network 100 includes a packet network 110, a public switched telephone network (PSTN) 115, a source device 120 and a destination device 130. In the illustrative embodiment shown in FIG. 1, the packet network 110 comprises an Asynchronous Transfer Mode (ATM) network. However, one skilled in the art readily understands that the present invention may use any type of packet network. The packet network 110 includes routers 140, 145, 150, 160, 165, 170 and a gateway 155. One skilled in the pertinent art understands that the packet network 110 may include any number of routers and gateways.

The source device 120 may generate a data packet to be sent to the destination device 130 through the packet network 110. In the illustrated example, the source device 120 initially sends the data packet to the first router 140. The first router 140 then determines from the data packet which router to send the data packet to based upon routing information and network loading. Some information in determining the selection of a next router may include the size of the data packet, loading of the communications link to a router and the destination. In this example, the first router 140 may send the data packet to the second router 145 or fourth router 160.

The data packet traverses from router to router within the packet network 110 until it reaches the gateway 155. In one particular example, the data packet may traverse along a path that includes the first router 140, the fourth router 160, the fifth router 165, the sixth router 170, the third router 150 and finally to the gateway 155. The gateway 155 converts the data packet from the protocol associated with the packet network 110 to a different protocol compatible with the PSTN 115. The gateway 155 then transmits the data packet to the destination device 130 via the PSTN 115. However, in another example, the data packet may traverse along a different path such as the first router 140, the second router 145, the third router 150 and finally to the gateway 155. It is generally desired when choosing a subsequent router, the path the data packet traverses should result in the fastest throughput for the data packet. It should be noted, however, that this path does not always include the least number of routers.

Figure 2:
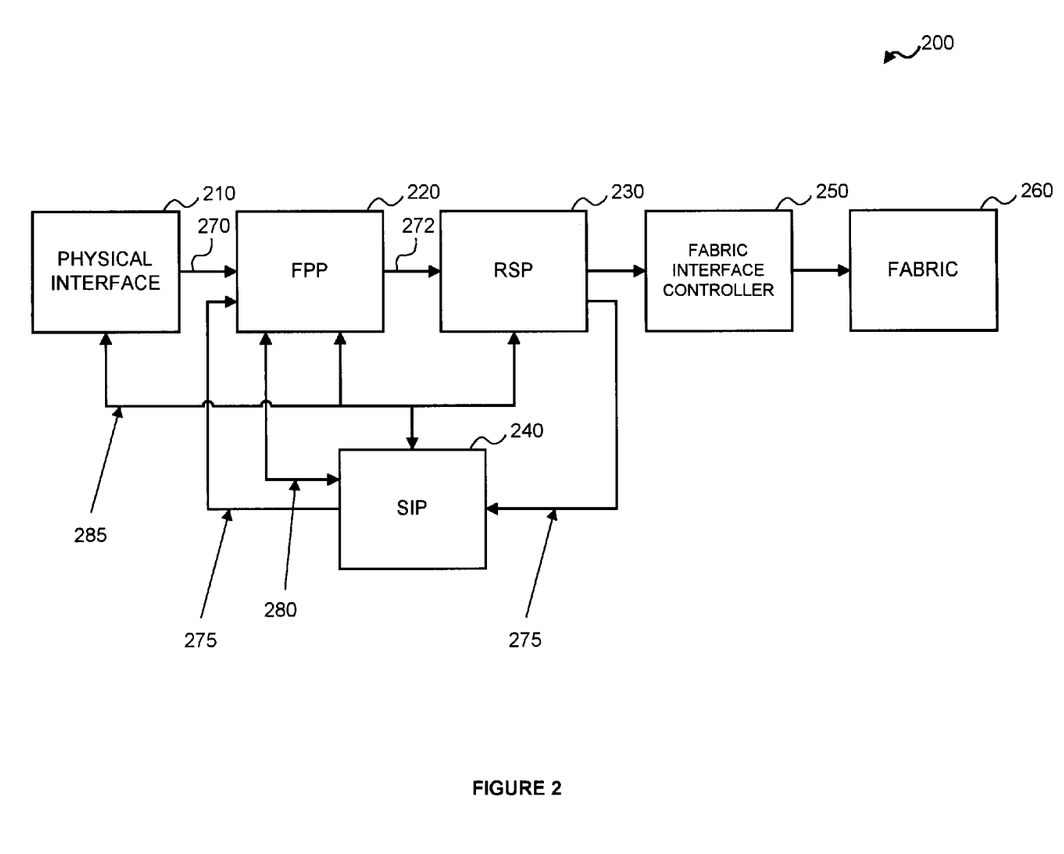
FIG. 2 illustrates a block diagram of an embodiment of a router architecture, constructed in accordance with the principles of the present invention.

Turning now to FIG. 2, illustrated is a block diagram of an embodiment of a router architecture, generally designated 200, constructed in accordance with the principles of the present invention. The router architecture 200, in one embodiment, may be employed in any of the routers illustrated in FIG. 1. The router architecture 200 provides a unique hardware and software combination that delivers high-speed processing for multiple communication protocols with full programmability. The unique combination provides the programmability of traditional reduced instruction set computing (RISC) processors with the speed that, until now, only application-specific integrated circuit (ASIC) processors could deliver.

In the embodiment shown in FIG. 2, the router architecture 200 includes a physical interface 210, a fast pattern processor (FPP) 220, a routing switch processor (RSP) 230, and a system interface processor (SIP) 240. The router architecture 200 may also include a fabric interface controller 250 which is coupled to the RSP 230 and a fabric network 260. It should be noted that other components not shown may be included within the router architecture 200 without departing from the scope of the present invention.

The physical interface 210 provides coupling to an external network. In an exemplary embodiment, the physical interface 210 is a POS-PHY/UTOPIA level 3 interface. The FPP 220, in one embodiment, may be coupled to the physical interface 210 and receives a data stream that includes protocol data units (PDUs) from the physical interface 210. The FPP 220 analyzes and classifies the PDUs and subsequently concludes processing by outputting packets to the RSP 230.

The FPP 220, in conjunction with a powerful high-level functional programming language (FPL), is capable of implementing complex pattern or signature recognition and operates on the processing blocks containing those signatures. The FPP 220 has the ability to perform pattern analysis on every byte of the payload plus headers of a data stream. The pattern analysis conclusions may then be made available to a system logic or to the RSP 230, allowing processing block manipulation and queuing functions. The FPP 220 and RSP 230 provide a solution for switching and routing. The FPP 220 further provides glueless interfaces to the RSP 230 and the SIP 240 to provide a complete solution for wire-speed processing in next-generation, terabit switches and routers.

As illustrated in FIG. 2, the FPP 220 employs a first communication link 270 to receive the data stream from the physical interface 210. The first communication link 270 may be an industry-standard UTOPIA Level 3/UTOPIA Level 2/POS-PHY Level 3 interface. Additionally, the FPP 220 employs a second communication link 272 to transmit packet and conclusions to the RSP 230. The second communication link 272 may be a POS-PHY Level 3 interface.

The FPP 220 also includes a management path interface (MPI) 275, a function bus interface (FBI) 280 and a configuration bus interface (CBI) 285. The MPI 275 enables the FPP 220 to receive management frames from a local microprocessor. In an exemplary embodiment, this may be handled through the SIP 240. The FBI 280 connects the FPP 220 and the SIP 240, or custom logic in certain situations, for external processing of function calls. The CBI 285 connects the FPP 220 and other devices (e.g., physical interface 210 and RSP 230) to the SIP 240. Other interfaces (not shown), such as memory interfaces, are also well within the scope of the present invention.

The FPP 220 provides an additional benefit in that it is programmable to provide flexibility in optimizing performance for a wide variety of applications and protocols. Because the FPP is a programmable processor rather than a fixed-function ASIC, it can handle new protocols or applications as they are developed as well as new network functions as required. The FPP 220 may also accommodate a variety of search algorithms. These search algorithms may be applied to large lists beneficially.

The RSP 230 is also programmable and works in concert with the FPP 220 to process the PDUs classified by the FPP 220. The RSP 230 uses the classification information received from the FPP 220 to determine the starting offset and the length of the PDU payload, which provides the classification conclusion for the PDU. The classification information may be used to determine the port and the associated RSP 230 selected for the PDU. The RSP 230 may also receive additional PDU information passed in the form of flags for further processing.

The RSP 230 also provides programmable traffic management including policies such as random early discard (RED), weighted random early discard (WRED), early packet discard (EPD) and partial packet discard (PPD). The RSP 230 may also provide programmable traffic shaping, including programmable per queue quality of service (QoS) and class of service (CoS) parameters. The QoS parameters include constant bit rate (CBR), unspecified bit rate (UBR), and variable bitrate (VBR). Correspondingly, CoS parameters include fixed priority, round robin, weighted round robin (WRR), weighted fair queuing (WFQ) and guaranteed frame rate (GFR).

Alternatively, the RSP 230 may provide programmable packet modifications, including adding or stripping headers and trailers, rewriting or modifying contents, adding tags and updating checksums and CRCs. The RSP 230 may be programmed using a scripting language with semantics similar to the C language. Such script languages are well known in the art. Also connected to the RSP 230 are the fabric interface controller 250 and the fabric network 260. The fabric interface controller 250 provide the physical interface to the fabric 260, which is typically a communications network.

The SIP 240 allows centralized initialization and configuration of the FPP 220, the RSP 230 and the physical interfaces 210, 250. The SIP 240, in one embodiment, may provide policing, manage state information and provide a peripheral component interconnect (PCI) connection to a host computer. The SIP 240 may be a PayloadPlus™ Agere System Interface commercially available from Agere Systems, Inc.

Figure 3:
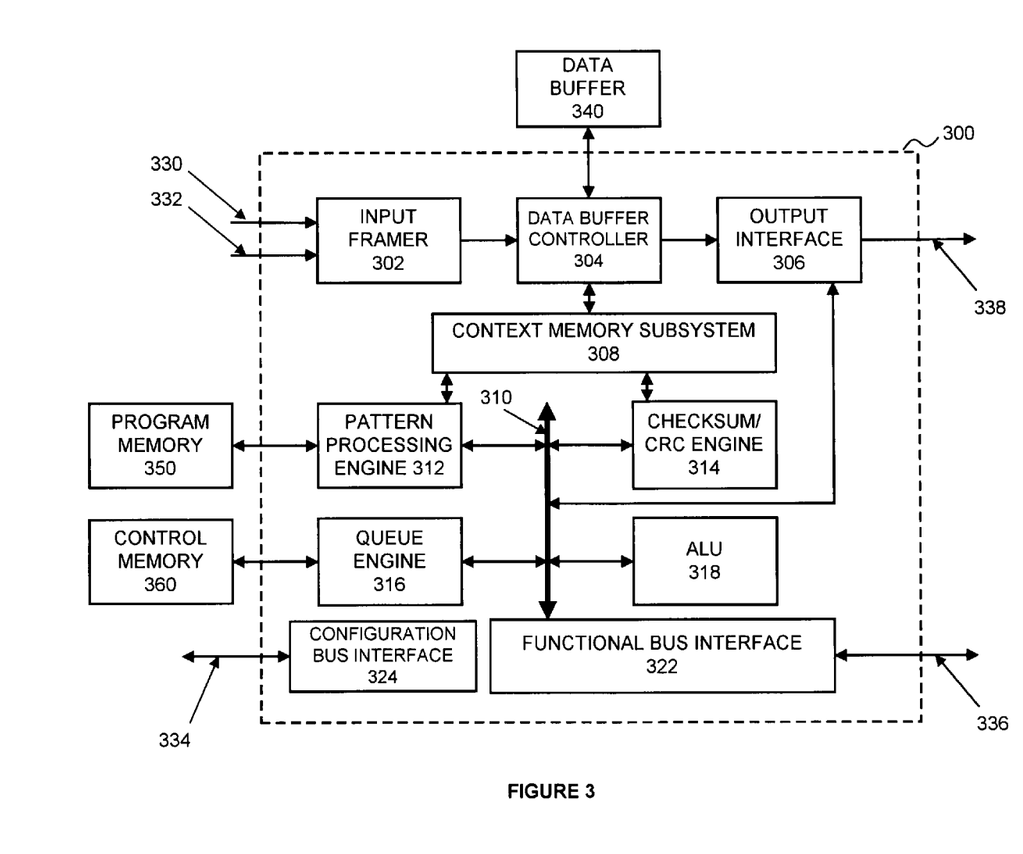
FIG. 3 illustrates a block diagram of an embodiment of a fast pattern processor (FPP), constructed in accordance with the principles of the present invention.

Turning now to FIG. 3, illustrated is a block diagram of an embodiment of a fast pattern processor (FPP), generally designated 300, constructed in accordance with the principles of the present invention. The FPP 300 includes an input framer 302 that receives PDUs via external input data streams 330, 332. The input framer 302 frames packets containing the PDUs into 64-byte processing blocks and stores the processing blocks into an external data buffer 340. The input data streams 330, 332 may be 32-bit UTOPIA/POS-PHY from PHY and 8-bit POS-PHY management path interface from SIP 240 (FIG. 2), respectively.

Typically, a data buffer controller 304 is employed to store the processing blocks to the external data buffer 340. The data buffer controller 304 also stores the processing blocks and associated configuration information into a portion of a context memory subsystem 308 associated with a context, which is a processing thread. As illustrated, the context memory subsystem 308 is coupled to a data buffer controller 304.

Additionally, the context memory subsystem 308 is coupled to a checksum/cyclical redundancy check (CRC) engine 314 and a pattern processing engine 312. The checksum/CRC engine 314 performs checksum or CRC functions on processing block and on the PDUs embodied with the processing block. The pattern processing engine 312 performs pattern matching to determine how PDUs are classified and processed. The pattern processing engine 312 is coupled to a program memory 350.

The FPP 300 further includes a queue engine 316 and an arithmetic logic unit (ALU) 318. The queue engine 316 manages replay contexts for the FPP 300, provides addresses for block buffers and maintains information on blocks, PDUs, and connection queues. The queue engine 316 is coupled to an external control memory 360 and the internal function bus 310. The ALU 318 is coupled to the internal function bus 310 and is capable of performing associated computational functions.

Also coupled to the internal function bus 310 is a functional bus interface 322. The functional bus interface 322 passes external functional programming language function calls to external logic through a data port 336. In one exemplary embodiment, the data port 336 is a 32-bit connection to the SIP 240 (FIG. 2). The FPP 300 also includes a configuration bus interface 320 for processing configuration requests from externally coupled processors. As illustrated, the configuration bus interface 320 may be coupled to a data port 334, such as an 8-bit CBI source.

Additionally, coupled to the internal function bus 310 is an output interface 306. The output interface 306 sends PDUs and their classification conclusions to the downstream logic. The output interface 306 may retrieve the processing blocks stored in the data buffer 340 and send the PDUs embodied within the processing blocks to an external unit through an output data port 338. The output data port 338, in an exemplary embodiment, is a 32-bit POS-PHY connected to the RSP 230 (FIG. 2).

Figure 4:
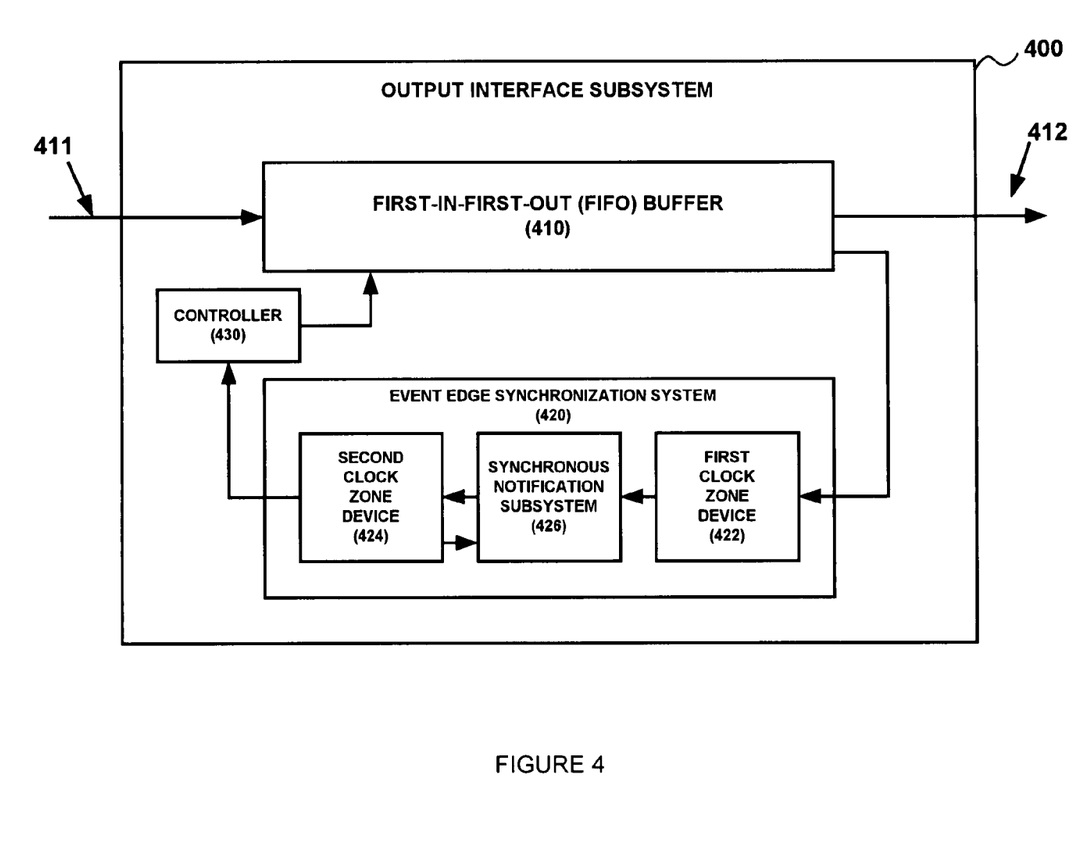
FIG. 4 illustrates a block diagram of an embodiment of a output interface subsystem, constructed in accordance with the principles of the present invention.

Turning now to FIG. 4, illustrated is a block diagram of an embodiment of a output interface subsystem, generally designated 400, constructed in accordance with the principles of the present invention. The output interface subsystem 400 may be embodied in a fast pattern processor (FPP), as described in FIG. 3 above. The output interface subsystem 400 receives processing blocks, associated with a protocol data unit (PDU), from a data buffer or a context memory subsystem within the FPP and re-transmits packets or payloads embodied within the processing blocks to an output port 412. The data buffer and context memory subsystem are discussed in more detail in FIG. 3.

The output interface subsystem 400 includes a first-in-first-out (FIFO) buffer 410, an event edge synchronization system 420 and a controller 430. The FIFO buffer 410 provides a buffering function by accepting processing blocks at its input 411 and clocking them through a collection of storage positions until they are transmitted via the output port 412. The FIFO buffer 410 employs a first clock zone having a first clock rate CR1 that is associated with clocking the processing blocks through an output portion of the FIFO buffer 410.

Additionally, the FIFO buffer 410 employs a second clock zone having a second clock rate CR2 that is associated with clocking the processing blocks through an input portion of the FIFO buffer 410. The first and second clock zones allow the FIFO buffer 410 to accommodate different timing requirements for processing blocks being retrieved and re-transmitted by the output interface subsystem 400. The first and second clock rates CR1, CR2, are asynchronous, meaning that the clocking transitions associated with the first and second clock rates CR1, CR2, do not always occur at the same time.

In the illustrated embodiment, the event edge synchronization system 420 provides a synchronous notification signal indicating that a block of data of the FIFO buffer 410 has been retrieved and re-transmitted. The event edge synchronization system 420 includes a first clock zone device 422, a second clock zone device 424 and a synchronous notification subsystem 426 The first clock zone device 422 is associated with the first clock zone of the FIFO buffer 410 and generates an event signal based upon the first clock rate CR1. This event signal is provided to the synchronous notification subsystem 426.

The synchronous notification subsystem 426 receives the event signal and synchronizes this event signal to the second clock rate CR2 provided by the second clock zone device 424, which is associated with the second clock zone of the FIFO buffer 410. This synchronization is based upon an edge transition of the event signal and the second clock rate CR2. The synchronous notification subsystem 426 generates the synchronous notification signal based upon this synchronization. The second clock zone device 424 receives the synchronous notification signal, further performs processing based upon it and provides synchronization information to the controller 430. The controller 430 uses the synchronization information provided to orchestrate the operation of the FIFO buffer 410, in the illustrated embodiment. Additionally, the controller 430 may also use the synchronization information to send a control or an acknowledgment signal to a device external to the output interface subsystem 400.

In another embodiment of the present invention, a second event edge synchronization system may also be employed to create a second synchronous notification signal that may be used for acknowledgment or handshaking between the first and second clock zones. For example, the controller 430 may send an acknowledgment event to the first clock zone device of the second event edge synchronization system in response to the synchronous notification signal generated by the first event edge synchronization system 420. Then, the second event edge synchronization system synchronizes the acknowledgment event and generates an acknowledgment synchronous notification signal used acknowledge the first event signal.

In yet another embodiment, a second event edge synchronization system may be employed to generated events associated with storing processing blocks in the FIFO buffer 410. For example, the second event edge synchronization system would employ event signals in a first clock zone that are associated with clocking the processing blocks through the input portion of the FIFO buffer 410. Then, a second clock zone having a second clock rate CR2 would be associated with clocking of the processing blocks through the output portion of the FIFO buffer 410. Of course, the second synchronous notification signal may be used either inside or outside the fast pattern processor, as appropriate.

Figure 5:
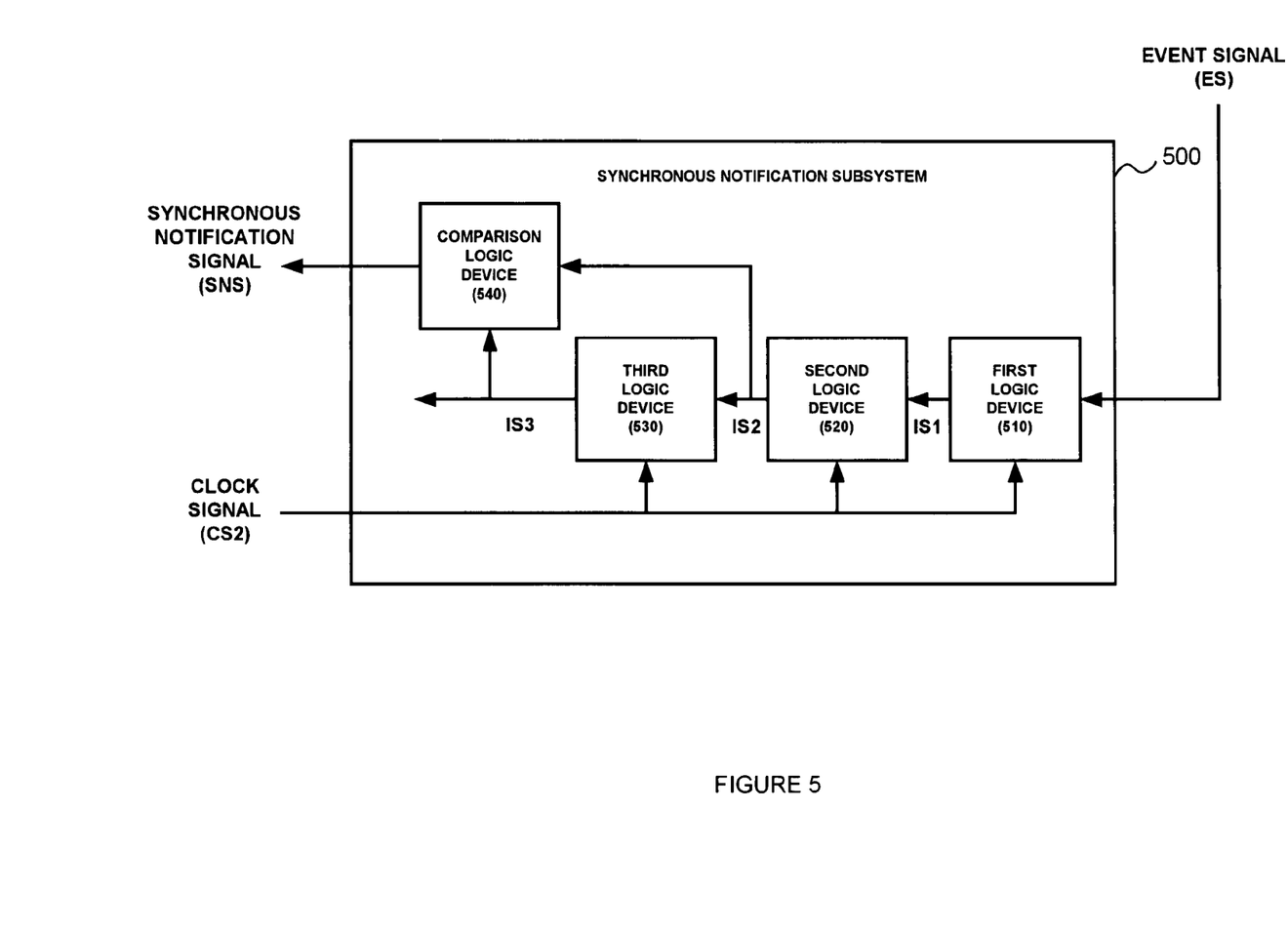
FIG. 5 illustrates a block diagram of an embodiment of a synchronous notification subsystem, constructed in accordance with the principles of the present invention.

Turning now to FIG. 5, illustrated is a block diagram of an embodiment of a synchronous notification subsystem, generally designated 500, constructed in accordance with the principles of the present invention. In the illustrated embodiment, the synchronous notification subsystem 500 includes a first logic device 510, a second logic device 520, a third logic device 530 and a comparison logic device 540.

The first logic device 510 is configured to generate a first intermediate signal IS1. Generation of this first intermediate signal IS1 is based upon receiving an event signal ES from a source indicating that an event has occurred and a clock signal CS2 of a second clock zone device. In the illustrated embodiment, the event signal ES is associated with a first of two asynchronous clock zones and may be a transition from one of two signal levels to the other. The first intermediate signal IS1 is representative of the event signal ES after one clocking transition of the clock signal CS2 has occurred.

The second logic device 520 is configured to generate a second intermediate signal IS2. Generation of the second intermediate signal IS2 is based upon receiving the first intermediate signal IS1 and the clock signal CS2 of the second clock zone device. The second intermediate signal IS2 is representative of the first intermediate signal IS1 after one clocking transition of the clock signal CS2 has occurred.

The third logic device 530 is configured to generate a third intermediate signal IS3. Generation of the third intermediate signal IS3 is based upon receiving the second intermediate signal IS2 and the clock signal CS2 of the second clock zone device. The third intermediate signal IS3 is representative of the second intermediate signal IS2 after one clocking transition of the clock signal CS2 has occurred.

The comparison logic device 540 is configured to generate a synchronous notification signal SNS. The synchronous notification signal SNS is based upon receiving the second and third intermediate signals IS2, IS3. In the illustrated embodiment, the synchronous notification signal SNS transitions between one of two signal levels thereby providing an edge signal that is representative of a synchronization between asynchronous first and second clock zones of a device.

Figure 6:
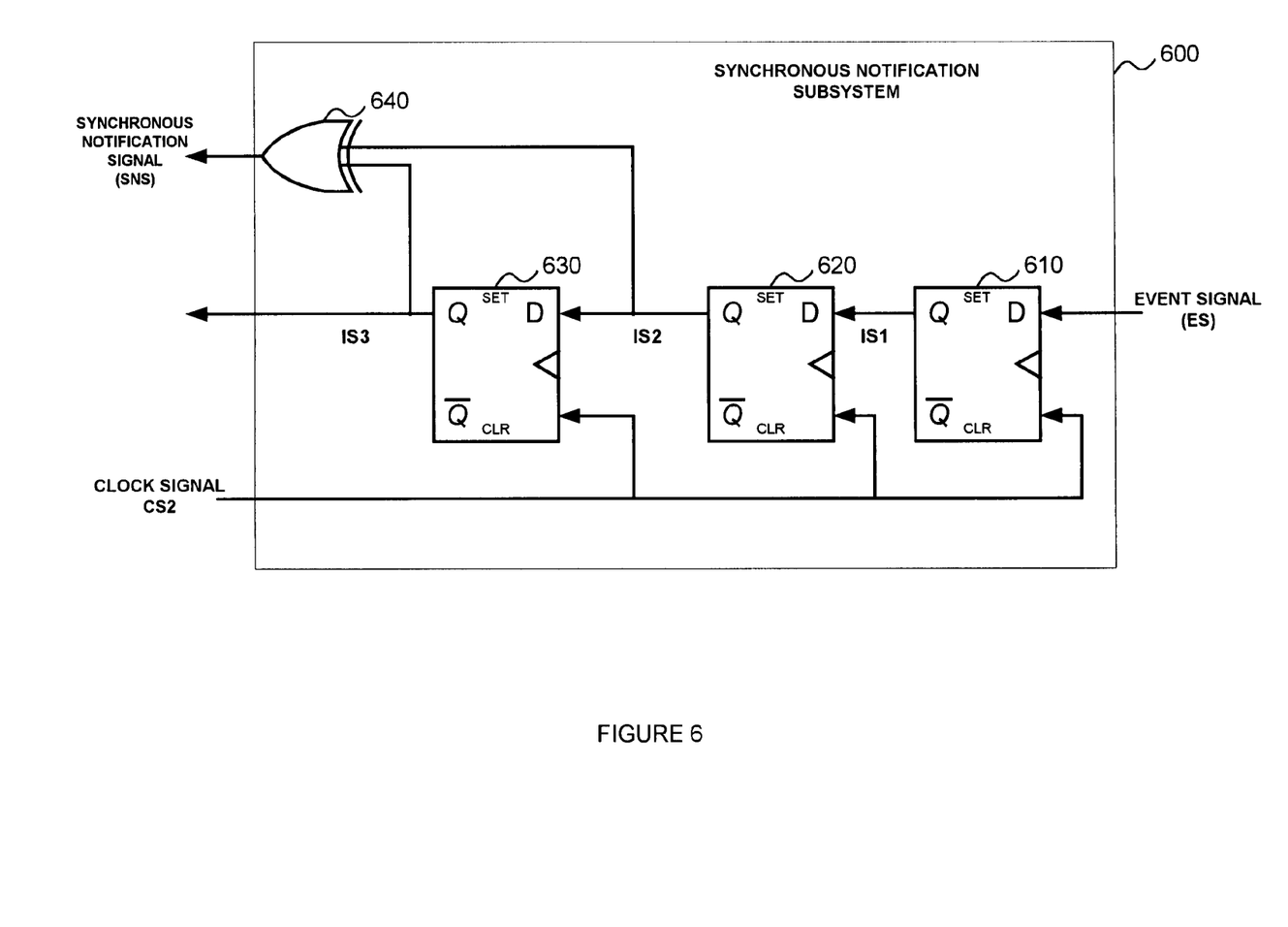
FIG. 6 illustrates a logic diagram of an embodiment of a synchronous notification subsystem, constructed in accordance with the principles of the present invention.

Turning now to FIG. 6, illustrated is a logic diagram of an embodiment of a synchronous notification subsystem, generally designated 600, constructed in accordance with the principles of the present invention. The synchronous notification subsystem 600 is employed with a device having first and second clock zones wherein an event signal ES is associated with the first clock zone. The synchronous notification subsystem 600 includes first, second and third "D" type flip-flops (DFFs) 610, 620, 630, and an exclusive-OR (XOR) gate 640.

The DFFs 610, 620, 630 function as first, second and third logic devices and the XOR gate 640 functions as a comparison logic device that provides a synchronous notification signal SNS. Each of the first second and third DFFs 610, 620, 630 have a data input D and a data output Q wherein the data output Q mimics the data input D at the time of a clocking transition. Additionally, each of the first, second and third DFFs 610, 620, 630 receives a clock signal CS2, which is associated with the second clock zone. The clock signal CS2 is used to synchronize data validity on the data output Q of each of the first, second and third DFFs 610, 620, 630.

In the illustrated embodiment, the event signal ES makes a positive edge transition from a LOW signal condition to a HIGH signal condition indicating that an event has occurred. The first DFF 610 receives the positive edge transition of the event signal ES at its data input D. At the next clocking transition of the clock signal CS2, the HIGH signal condition at the data input D of the first DFF 610 is transferred to its data output Q as a first intermediate signal IS1 representing the event signal ES. Then, at the next clocking transition of the clock signal CS2, the HIGH signal condition provided by the data output Q of the first DFF 610 to the data input D of the second DFF 620 is transferred to the data output Q of the second DFF 620 as a second intermediate signal IS2 representing the first intermediate signal IS1.

At the culmination of this action (i.e., after the second clocking transition following the positive edge transition of the event signal ES), the output of the XOR gate 640, which provides the synchronous notification signal SNS, transitions to a HIGH signal condition. This occurs since the data output Q of the second DFF 620 is in a HIGH signal condition and the data output Q of the third DFF 630 is still in a LOW signal condition producing the HIGH signal condition of the output of the XOR gate 640. This HIGH signal condition of the synchronous notification signal SNS synchronizes the event signal ES to a second clock rate CR2 associated with the second clock zone and provides a synchronous indication between the first and second clock zones for the event signal ES.

The next clocking transition of the clock signal CS2 transfers the HIGH signal condition of the second intermediate signal IS2 to the data output Q of the third DFF 630 as a third intermediate signal IS3 representing the second intermediate signal IS2. This action causes the output of the XOR gate 640 to return to a LOW signal condition for the synchronous notification signal SNS. Similarity, as will be discussed in FIG. 7 below, the event edge synchronous system 600 may provide the same type of synchronous notification signal SNS for an event signal ES that makes a negative edge transition from a HIGH signal condition to a LOW signal condition.

Figure 7:
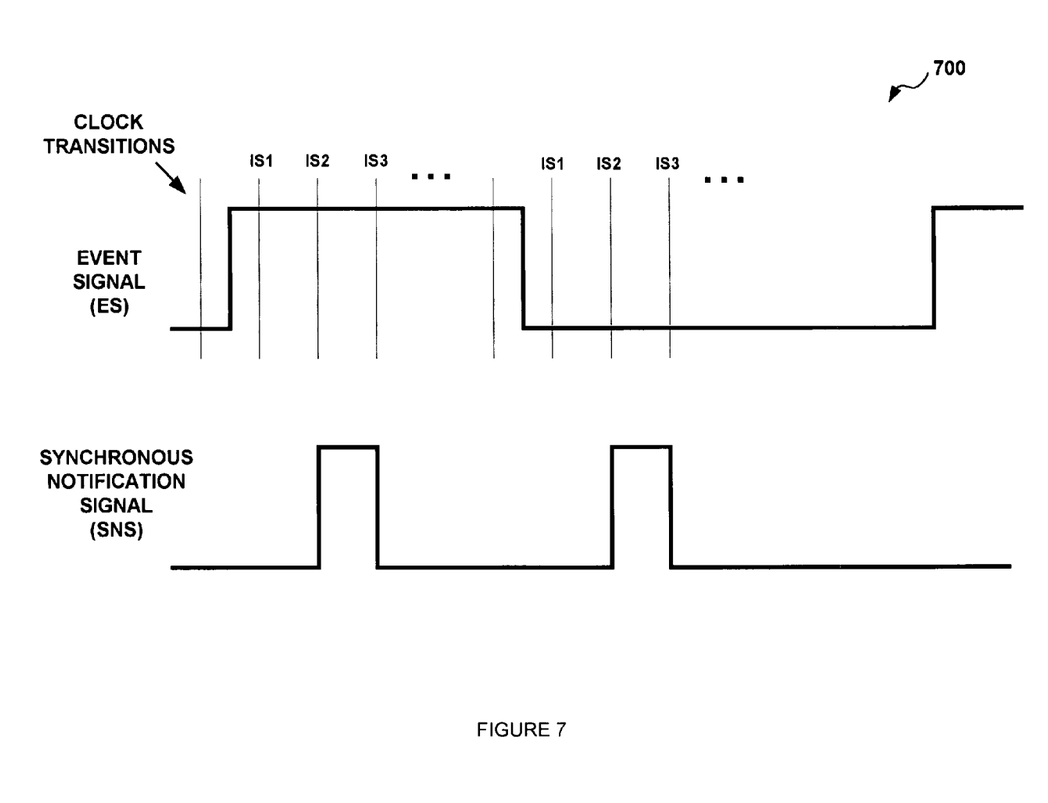
FIG. 7 illustrates a timing diagram showing timing events associated with an embodiment of a synchronous notification signal constructed in accordance with the principles of the present invention.

Turning now to FIG. 7, illustrated is a timing diagram, generally designated 700, showing timing events associated with an embodiment of a synchronous notification signal constructed in accordance with the principles of the present invention. The timing diagram 700 includes an event signal ES and a synchronous notification signal SNS. The event signal ES further shows appropriate collections of clocking transition times associated with an event edge synchronization system, which generates the synchronous notification signal SNS. In the illustrated embodiment, timing of the event signal ES is associated with a first clock zone and the clocking transition times are representative of a second clock zone that is asynchronous with the first clock zone.

The event signal ES makes a positive edge transition from a LOW signal condition to a HIGH signal condition indicating that an event has occurred. At the next clocking transition, the first intermediate signal IS1 associated with the event edge synchronization system reflects the condition of the event signal ES. Similarly, at the following two clocking transitions, the second and third intermediate signals IS2, IS3, respectively, reflect the condition of the event signal ES (see, for instance, FIG. 6 and the related description for an explanation of the generation of the intermediate signals).

The synchronous notification signal SNS makes a positive transition from a LOW to a HIGH signal condition as the second intermediate signal IS2 reflects the condition of the event signal ES and the third intermediate signal does not yet reflect the condition of the event signal ES. The synchronous notification signal SNS then makes a negative transition from a HIGH to a LOW signal condition as the third intermediate signal IS3 reflects the condition of the event signal ES.

After a period of time, the event signal ES makes a negative edge transition from a HIGH signal condition to a LOW signal condition indicating that another event has occurred. At the next clocking transition, the first intermediate signal IS1 associated with the event edge synchronization system again reflects the condition of the event signal ES. As before, at the following two clocking transitions, the second and third intermediate signals IS2, IS3, respectively, reflect the condition of the event signal ES.

In the illustrated embodiment, the synchronous notification signal SNS again makes a positive transition from a LOW to a HIGH signal condition as the second intermediate signal IS2 reflects the condition of the event signal ES and the third intermediate signal does not yet reflect the condition of the event signal ES. The synchronous notification signal SNS then makes a negative transition from a HIGH to a LOW signal condition as the third intermediate signal IS3 reflects the condition of the event signal ES.

Although the present invention has been described in detail, those skilled in the art should understand that they can make various changes, substitutions and alterations herein without departing from the spirit and scope of the invention in its broadest form.

What is claimed is:

1. A fast pattern processor, comprising:
    a data buffer that stores processing blocks associated with a protocol data unit (PDU);
    a context memory subsystem associated with said data buffer that receives said processing blocks;
    a pattern processing engine, associated with said context memory, that performs pattern matching upon said processing blocks; and
    an output interface subsystem that receives said processing blocks from said data buffer or said context memory subsystem and re-transmits packets or payloads embodied within said processing blocks, said output interface subsystem, including:

a first-in-first-out (FIFO) buffer; and an event edge synchronization system that provides a synchronous notification signal indicating that a block of data of said FIFO buffer has been retrieved and re-transmitted, said event edge synchronization system having:

a first clock zone device that generates an event signal based upon a first clock rate, said first clock zone device is associated with an output portion of said FIFO buffer;

a second clock zone device that receives said synchronous notification signal based upon a second clock rate and performs processing based upon said synchronous notification signal, said second clock rate asynchronous with said first clock rate; and a synchronous notification subsystem that receives said event signal, synchronizes said event signal to said second clock rate based upon an edge transition of said event signal and said second clock rate, and generates said synchronous notification signal.

2. The fast pattern processor as recited in claim 1 wherein said synchronous notification subsystem further includes:

a first logic device that generates a first intermediate signal based upon said event signal and a clock signal of said second clock zone device;

a second logic device that generates a second intermediate signal based upon said first intermediate signal and said clock signal of said second clock zone device;

a third logic device that generates a third intermediate signal based upon said second intermediate signal and said clock signal of said second clock zone device; and a comparison logic device that generates said synchronous notification signal based upon said second and third intermediate signals.

3. The fast pattern processor as recited in claim 2 wherein said first, second and third logic devices are "D" type flip-flops.

4. The fast pattern processor as recited in claim 2 wherein said comparison logic device is an exclusive-OR (XOR) gate.

5. The fast pattern processor as recited in claim 1 wherein said synchronous notification subsystem synchronizes said event signal to said second clock rate based upon a positive edge transition of said event signal.

* * * * *